(12) United States Patent
Kang

(10) Patent No.: US 10,035,184 B2
(45) Date of Patent: Jul. 31, 2018

(54) MATERIAL FOR EYEWEAR AND EYEWEAR STRUCTURE

(75) Inventor: James W. Kang, Laguna Hills, CA (US)

(73) Assignee: CORNERSTONE INTELLECTUAL PROPERTY, Lake Forest, CA (US)

( * ) Notice: Subject to any disclaimer, the term of this patent is extended or adjusted under 35 U.S.C. 154(b) by 372 days.

(21) Appl. No.: 13/476,714

(22) Filed: May 21, 2012

(65) Prior Publication Data
US 2012/0293765 A1    Nov. 22, 2012

Related U.S. Application Data

(60) Provisional application No. 61/488,719, filed on May 21, 2011.

(51) Int. Cl.
| | |
|---|---|
| G02C 1/00 | (2006.01) |
| B22D 25/02 | (2006.01) |
| B22D 25/06 | (2006.01) |
| C22C 45/02 | (2006.01) |
| C22C 45/10 | (2006.01) |
| G02C 1/08 | (2006.01) |
| G02C 5/22 | (2006.01) |
| C22C 1/00 | (2006.01) |
| C22C 33/00 | (2006.01) |

(52) U.S. Cl.
CPC ............ B22D 25/02 (2013.01); B22D 25/06 (2013.01); C22C 1/002 (2013.01); C22C 33/003 (2013.01); C22C 45/02 (2013.01); C22C 45/10 (2013.01); G02C 1/08 (2013.01); G02C 5/2209 (2013.01); G02C 2200/04 (2013.01); G02C 2200/12 (2013.01)

(58) Field of Classification Search
CPC ...... G02C 5/008; G02C 2200/12; G02C 5/16; G02C 2200/10; G02C 5/2218
USPC ............ 351/41, 83, 90, 110, 103, 111, 158; 148/403
See application file for complete search history.

(56) References Cited

U.S. PATENT DOCUMENTS

| | | |
|---|---|---|
| 5,032,196 A | 7/1991 | Masumoto et al. |
| 5,279,349 A | 1/1994 | Horimura |
| 5,288,344 A | 2/1994 | Peker |
| 5,368,659 A | 11/1994 | Peker |

(Continued)

FOREIGN PATENT DOCUMENTS

| | | | |
|---|---|---|---|
| JP | 2000-019461 | * | 1/2000 |
| JP | 2001303218 A | | 10/2001 |

OTHER PUBLICATIONS

International Search Report received in the corresponding International application No. PCT/US2012/038837, dated Aug. 12, 2012.

(Continued)

*Primary Examiner* — Hung Dang
(74) *Attorney, Agent, or Firm* — Davé Law Group, LLC; Raj S. Davé

(57) ABSTRACT

Eyewear and eyewear structures comprising bulk-solidifying amorphous alloys and methods of making eyewear structures from such bulk-solidifying amorphous alloys are described. The bulk-solidifying amorphous alloys provide form and shape durability, the minimum use of fasteners in the eyewear structure, high resistance to chemical and environmental effects, and low-cost net-shape fabrication for intricate eyewear design and shapes.

14 Claims, 2 Drawing Sheets

(56) References Cited

U.S. PATENT DOCUMENTS

| | | | |
|---|---|---|---|
| 5,618,359 A | 4/1997 | Lin | |
| 5,735,975 A | 4/1998 | Lin | |
| 5,908,065 A | 6/1999 | Chadwick | |
| 6,325,868 B1 | 12/2001 | Kim | |
| 6,758,562 B1 * | 7/2004 | Barnette | G02C 3/003 |
| | | | 351/111 |
| 7,101,039 B2 | 9/2006 | Maling | |
| 7,794,553 B2 | 9/2010 | Duan et al. | |
| 7,906,219 B2 | 3/2011 | Ohara et al. | |
| 2006/0137772 A1 | 6/2006 | Xu et al. | |
| 2013/0128218 A1 * | 5/2013 | Vignato | G02C 1/02 |
| | | | 351/110 |

OTHER PUBLICATIONS

Hays, et al., "Microstructure Controlled Shear Band Pattern Formation and Enhanced Plasticity of Bulk Metallic Glasses Containing in situ Formed Ductile Phase Dendrite Dispersions", Physical Review Letters, vol. 84, 2000, p. 2901-2904.

Inoue, et al., "Bulk amorphous alloys with high mechanical strength and good soft magnetic properties in Fe—TM—B (TM5IV—VIII group transition metal) system", Appl. Phys. Lett., vol. 7, 1997, p. 464-466.

Shen, et al., "Bulk Glassy C043Fe20Tas.sB31.S Alloy with High Glass-Fornting Ability and Good Soft Magnetic Properties", Mater. Trans. JIM, vol. 42, 2001, p. 2136-2139.

Thirugnanam, M., "Modern High Pressure Die-Casting Processes for Aluminium Castings", Transaction of Indian Foundry Congress, vol. 61, pp. 1-7, 2013.

\* cited by examiner

MATERIAL FOR EYEWEAR AND EYEWEAR STRUCTURE

RELATED APPLICATION

This application claims priority from U.S. Provisional Application Ser. No. 61/488,719, filed May 21, 2011, which is hereby incorporated by reference in its entirety.

All publications, patents, and patent applications cited in this Specification are hereby incorporated by reference in their entirety.

BACKGROUND

The eyewear includes a variety of eyeglasses, sunglasses, protective work glasses and sports goggles. The eyewear generally comprises an eyewear structure defining a pair of openings, and a pair of lenses, which are fitted there into openings and secured by the eyewear structure. The eyewear may also comprise other auxiliary components, such as nose-pads, clip-on sunshades and even electronic components, such as digital music players. In some cases the lenses can be prescription lenses for vision enhancement and correction, and in other cases the purpose of lenses can be to provide protection from the sun and irradiation. It is also common to perceive the eyewear, whether with or without corrective lenses, as a fashion item. As such, eyewear is also designed to provide pleasing appearances and aesthetics, or to achieve a combination of the above-mentioned functions.

Conventional eyewear structures typically include a pair of rims for holding the lenses, a bridge for connecting the rims, and a pair of temples (or ear stems) attached to the rims via a hinge mechanism. A typical hinge mechanism typically includes interlocking pieces on the rim and on the temple, and a fastener, such as a screw, to secure the interlocking pieces on the rim and temple together. Despite many improvements made to the hinge mechanisms, they are prone to mechanical failure. It is quite common for the hinge fasteners to become loose during normal wear, resulting in the failure of eyewear structure. Furthermore, conventional hinge mechanisms, or their alternates, typically decrease the strength and structural integrity of eyewear structure, making them susceptible to breakage, twisting, or deformation. They are also more costly to manufacture.

In conventional eyewear, the lenses are generally secured to the rims by various fasteners, such as screws, bolts, and nuts. Other mechanisms, such as strings knotted to rims, are also utilized to secure the lenses onto the opening of rim. Similar problems can also be observed in this respect. The screws or fasteners become loose during normal wear, resulting in the failure of eyewear structure and/or falling off of the lenses. Finally, the use of fasteners, such as screws and bolts, can greatly degrade the pleasing appearance and aesthetics of eyewear, making their use much less desirable.

Accordingly, there exists a need for eyewear structures with no or minimal use of fasteners. There is also a need to develop new eyewear structures, which can provide various eyewear functions with greater aesthetics, high structural integrity and durability.

SUMMARY

One embodiment provided herein is related to eyewear and eyewear structures, which comprise bulk-solidifying amorphous alloys. Another embodiment is related to methods of making near-net shape structures from bulk-solidifying amorphous alloys, which structures may be used for eyewear.

One embodiment is related to eyewear and eyewear structures comprising bulk-solidifying amorphous alloys, and methods of making eyewear structures and eyewear components in near-net shape.

One embodiment provides a method making an eyewear structure, the method comprising: providing a homogeneous alloy feedstock of amorphous alloy; heating the feedstock to a casting temperature above a melting temperature of the alloy; introducing the molten alloy into the die cavity having the near-net shape of eyewear structure; and cooling the molten alloy to temperatures below a glass transition temperature of the alloy.

Another embodiment provides an eyewear structure comprising at least one bulk-solidifying amorphous alloy.

In one embodiment, the eyewear structure comprises at least one part made of bulk solidifying amorphous alloy.

In another embodiment, the eyewear structure has no fasteners and the eyewear structure is substantially made of bulk solidifying amorphous alloy.

In still another embodiment, the eyewear structure comprises three parts substantially made of bulk solidifying amorphous alloy: a front piece defining two openings to hold lenses and a pair of side temples (or ear stems).

In still another embodiment, the eyewear structure comprises three near-net shape manufactured parts substantially made of bulk solidifying amorphous alloy: a front piece defining two openings to hold lenses and a pair of side temples (or ear stems).

In still another embodiment, the front piece defining two openings of the eyewear structure is substantially made of bulk solidifying amorphous alloy.

In still another embodiment, the side temples (or ear stems) of the eyewear structure are substantially made of bulk solidifying amorphous alloy.

In another embodiment, the eyewear structure is substantially made of bulk solidifying amorphous alloy, and the eyewear structure has no need of fasteners to secure the lenses onto the rim openings.

In another embodiment, the eyewear structure is substantially made of bulk solidifying amorphous alloy, and the eyewear structure has no need of fasteners to secure the temples to the rims.

In one embodiment of the invention, the eyewear structure comprises at least partially a Zr—Ti based bulk solidifying amorphous alloy.

In still another embodiment, the bulk solidifying amorphous alloy in the eyewear structure is Be free.

In yet another embodiment, the eyewear structure at least partially made of a Zr/Ti based bulk-solidifying amorphous alloy with in-situ ductile crystalline precipitates.

In still yet another embodiment, the eyewear structure comprises a bio-compatible bulk solidifying amorphous alloy.

In still yet another embodiment, a molten piece of bulk-solidifying amorphous alloy is cast into a near-net shape manufactured eyewear structure.

In still yet another embodiment, a stock feed of bulk-solidifying amorphous alloy is molded into a near-net shape manufactured eyewear structure.

In still yet embodiment, at least part of a near-net shape manufactured eyewear structure is formed by casting or molding the bulk-solidifying amorphous alloy.

In still yet another embodiment, the near-net shape manufactured eyewear structure is a near-net shape molding component.

In still yet another embodiment, the near-net shape manufactured eyewear structure is a near-net shape cast component.

Provided in one embodiment is a method of fabricating a near-net shape manufactured eyewear structure, the method comprising: providing a feed stock of molten alloy at above Tm; introducing the molten alloy to the die cavity having the near-net shape of eyewear structure; quenching and take the part out of the die cavity; and final finishing.

In another embodiment, a method of fabricating a near-net shape manufactured eyewear structure comprises the following steps: a feed stock of amorphous alloy in amorphous phase is provided. Heat the feed stock to above Tg, but below Tx; and shaping the heated feed stock into desired near-net shape eyewear structure and cool. Optional and additional final finishing may also be applied.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
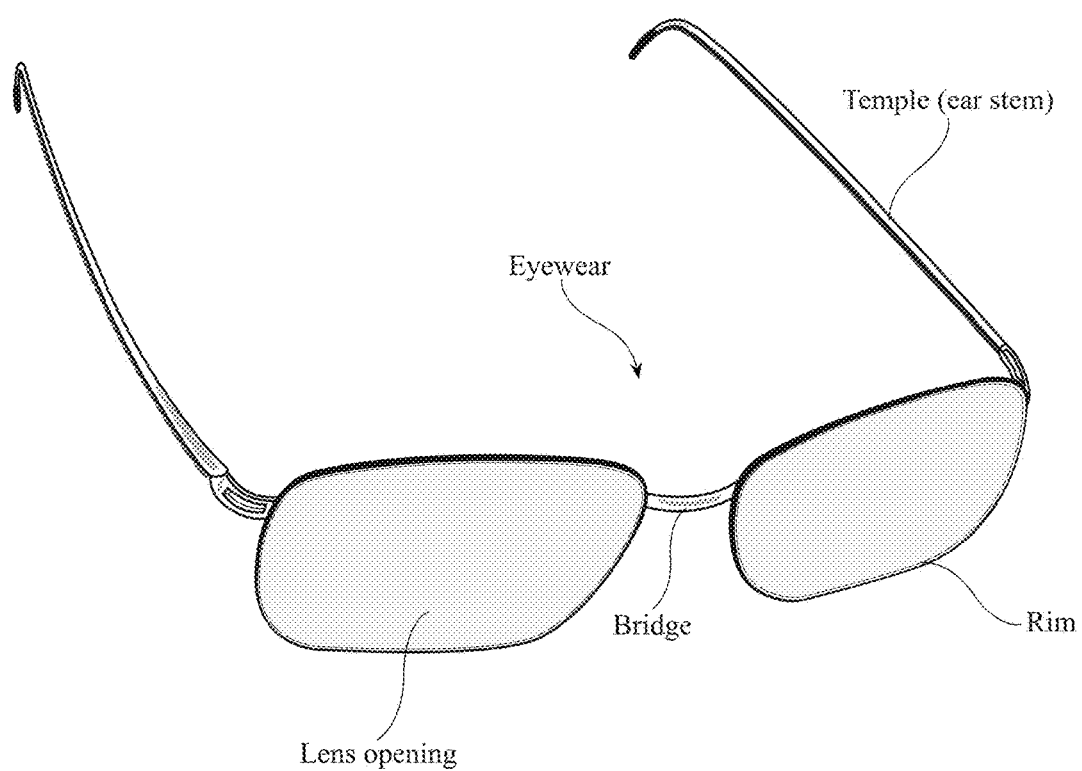
FIG. 1 is a picture of an eyewear structure according to one exemplary embodiment, wherein at least a portion of the structure is made of bulk-solidifying amorphous alloy.

One embodiment is related to eyewear and eyewear structures made of bulk-solidifying amorphous alloys, the bulk-solidifying amorphous alloys providing form and shape durability, the minimum use of fasteners in the eyewear structure, high resistance to chemical and environmental effects, and low-cost near-net shape fabrication for intricate eyewear design and shapes. Another embodiment is related to a method of making eyewear and eyewear structures from such bulk-solidifying amorphous alloys in near-net shape.

Bulk Solidifying Amorphous Alloys

Bulk solidifying amorphous alloys, also known as bulk metallic glasses ("B M G") or bulk amorphous alloys, are a recently discovered family of amorphous alloys, which can be cooled at a critical cooling rate of about 500 K/sec or less, and substantially retain their amorphous atomic structure. The critical cooling rate in some embodiments herein may refer to the cooling rate below which an amorphous structure is not favorable and thus is not likely to form. The cooling rate may be, for example, 400 K/sec or less—e.g., 300 K/sec or less, 250 K/sec or less, 200 K/sec or less. As such, they can be produced in thicknesses of 0.5 mm or more, substantially thicker than conventional amorphous alloys, which are typically limited to thicknesses of 0.020 mm, and which need cooling rates of $10^5$ K/sec or more. U.S. Pat. Nos. 5,288,344; 5,368,659; 5,618,359; and 5,735,975, disclose such bulk solidifying amorphous alloys.

The term "bulk solidifying amorphous alloy" described in at least one embodiment herein may refer to an amorphous alloy that has at least one dimension that is in the millimeter range. This dimension may refer to the smallest dimension in one embodiment. Depending on the geometry, the dimension may refer to thickness, height, length, width, radius, and the like. In one embodiment, the smallest dimension is at least about 0.5 mm—e.g., at least 1 mm, 2 mm, 3 mm, 4 mm, 5 mm, 6 mm, 8 mm, 10 mm, 12 mm, or more. The magnitude of the largest dimension is not limited and may be in the millimeter range, centimeter range, or even meter range.

A family of bulk solidifying amorphous alloys can be described as a Zr-based alloy, such as a Zr—Ti based alloy, such as $(Zr, Ti)a(Ni, Cu, Fe)b(Be, Al, Si, B)c$, where a is in the range of from 30 to 75, b is in the range of from 5 to 60, and c in the range of from 0 to 50 in atomic percentages. Furthermore, these basic alloys can accommodate substantial amounts (up to 20% atomic, and more) of other transition metals, such as Nb, Cr, V, Co. A preferable alloy family is $(Zr, Ti)a(Ni, Cu)b(Be)c$, where a is in the range of from 40 to 75, b is in the range of from 5 to 50, and c in the range of from 5 to 50 in atomic percentages. Other incidental, inevitable minute amount of impurities may also be present.

Still, a more preferable composition is $(Zr, Ti)a(Ni, Cu)b(Be)c$, where a is in the range of from 45 to 65, b is in the range of from 7.5 to 35, and c in the range of from 10 to 37.5 in atomic percentages. Another preferable alloy family is $(Zr)a(Nb, Ti)b(Ni, Cu)c(Al)d$, where a is in the range of from 45 to 65, b is in the range of from 0 to 10, c is in the range of from 20 to 40 and d in the range of from 7.5 to 15 in atomic percentages. Other incidental, inevitable minute amount of impurities may also be present.

Another set of bulk-solidifying amorphous alloys are ferrous metal (Fe, Ni, Co) based compositions. Examples of such compositions are disclosed in U.S. Pat. No. 6,325,868 and in publications to (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #2001303218 A. One exemplary composition of such alloys is $Fe_{72}A_{15}Ga_2P_{11}C_6B_4$. Another exemplary composition of such alloys is $Fe_{72}A_{17}Zr_{10}Mo_5W_2B_{15}$. Although in some embodiments these alloy compositions are not processable to the degree of the Zr-base alloy systems, they can still be processed in thicknesses of 1.0 mm or more, sufficient enough to be utilized in some embodiment described herein.

Bulk-solidifying amorphous alloys have typically high strength and high hardness. For example, Zr and Ti-base amorphous alloys typically have yield strengths of 250 ksi or higher and hardness values of 450 Vickers or higher. In some embodiments, the yield strength is about 300 ksi or higher—e.g., at least 400 ksi, 500 ksi, 600 ksi, 800 ksi, or higher. In some embodiments, the hardness values is at least 500 Vickers—e.g., at least 550, 600, 700, 800, 900 Vickers, or higher.

The ferrous-base version of these alloys can have yield strengths up to 500 ksi or higher and hardness values of 1000 Vickers and higher. In some embodiments, the yield strength is about 550 ksi or higher—e.g., at least 600 ksi, 700 ksi, 800 ksi, 900 ksi, or higher. In some embodiments, the hardness values is at least 1000 Vickers—e.g., at least 1100, 1200, 1400, 1500, 1600 Vickers, or higher.

As such, these alloys display excellent strength-to-weight ratio. Furthermore, bulk-solidifying amorphous alloys have good corrosion resistance and environmental durability, especially the Zr and Ti based alloys. Amorphous alloys generally have high elastic strain limit of at least 0.5%, including at least 1%, 1.5%, 1.6%, 1.8%, 2%, or more—this value is much higher than any other metallic alloy known to date.

In general, crystalline precipitates in bulk amorphous alloys may be detrimental to the properties of amorphous alloys, especially to the toughness and strength of these alloys, and as such it is generally preferred to minimize the volume fraction of these precipitates. However, there are cases in which, ductile crystalline phases precipitate in-situ during the processing of bulk amorphous alloys, which may be beneficial to the properties of bulk amorphous alloys, especially to the toughness and ductility of the alloys. One exemplary case is disclosed in (C. C. Hays et. al, Physical Review Letters, Vol. 84, p 2901, 2000. Such bulk amorphous alloys comprising these beneficial precipitates may be employed in at least one embodiment described herein.

Applications

The bulk solidifying amorphous alloys described herein are versatile and may be employed in a variety of applications. One such application is an eyewear or a structural component of an eyewear. As provided herein, the component may refer to any component of a conventionally known eyewear—e.g., frame, temple, support, etc. The eyewear or a structural component thereof described herein may comprise any of the bulk solidifying amorphous alloys described herein, such as consisting essentially of the bulk solidifying amorphous alloys described herein, such as consisting of the bulk solidifying amorphous alloys described herein.

As a result of the use of these bulk-solidifying amorphous alloys, the eyewear structures described herein have characteristics that are improved over conventional eyewear structures made of ordinary metallic or plastic materials. The surprising and novel advantages of using bulk-solidifying amorphous alloys in eyewear structures will be described in various embodiments below.

First, in embodiment the combination of high strength and high strength-to-weight ratio of the bulk solidifying amorphous alloys significantly reduces the overall weight and bulkiness (e.g., thickness) of the eyewear structure that may be employed herein without jeopardizing the structural integrity and providing better protection for lenses. In embodiment, the ability to fabricate eyewear structures with thinner walls may be important in reducing the bulkiness of the eyewear and increasing its aesthetics and pleasing appearances. This increased structural strength and durability is particularly useful for the designers, allowing them to design the eyewear into new shapes and forms with high fashion and aesthetics value.

Secondly, the amorphous atomic structure of the bulk solidifying amorphous alloys provides a featureless microstructure providing consistent properties and characteristics. In one embodiment, a featureless microstructure refers to a lack of observable presence of grains, grain boundaries, or other commonly known crystallographic features, due at least in part to the amorphous microstructure. In the case of a crystalline material, these features are often "weak spots" with less lower mechanical strength and often more susceptible to chemical attacks. Thus, by having an amorphous structure, the general deficiencies of multi-phase and polycrystalline microstructure of ordinary metals may be avoided in the amorphous alloys described herein. For example, the surfaces of bulk solidifying amorphous alloys can be polished to very high degrees of smoothness and cosmetic finishes with pleasing appearances.

Furthermore, bulk-solidifying amorphous alloys have very high elastic strain limits. As described above, the limit may be about 1.8% or higher. This is an important characteristic for the use and application for eyewear structures. For example, a high elastic strain limit allows the eyewear structure to be thinner, lighter, and to be designed into more intricate shapes. High elastic strain limits also allow the eyewear structures to sustain loading and flexing without permanent deformation or destruction of the eyewear, especially during assembly and securing of lenses.

In addition, eyewear structures comprising bulk solidifying amorphous alloys also have good corrosion resistance and high inertness. The high corrosion resistance and inertness of these materials are useful for preventing eyewear structures from getting decayed due the environmental effects. Finally, the above mentioned properties in combination of high strength, high hardness, high elasticity and corrosion resistance, can render an eyewear more durable, resistant to wear and scratch during normal use.

One embodiment described herein is related to an eyewear and eyewear structure, which minimizes the use (and need) of fasteners. Specifically, the eyewear structure utilizes the 1 elastic properties of bulk-solidifying amorphous alloys and minimizes the use of fasteners in the eyewear. For example, in one embodiment the lenses are secured to eyewear structure with the minimal use of fasteners. In another embodiment, the use of fasteners is avoided in the hinge mechanism linking the front rim pieces to side temples (or ear stems).

FIG. 1 shows an eyewear structure according to one embodiment, the eye structure including: a front piece having two rim portions defining two separate openings to hold lenses and a pair of side temples (or ear stems). In one embodiment, the front piece is a single near-net shape manufactured piece, wherein the rim portions are connected via a bridge portion. Alternatively, the portions of front piece, rims and bridge, can be produced individually and then bonded together into a single piece structure by common bonding and joining methods such as welding, brazing and soldering. In one embodiment, the pieces (i.e., front piece and pair of temples) comprise substantially bulk-solidifying amorphous alloy. In one embodiment, all the pieces are near-net shape manufactured pieces comprising substantially bulk solidifying amorphous alloy.

Figure 2:
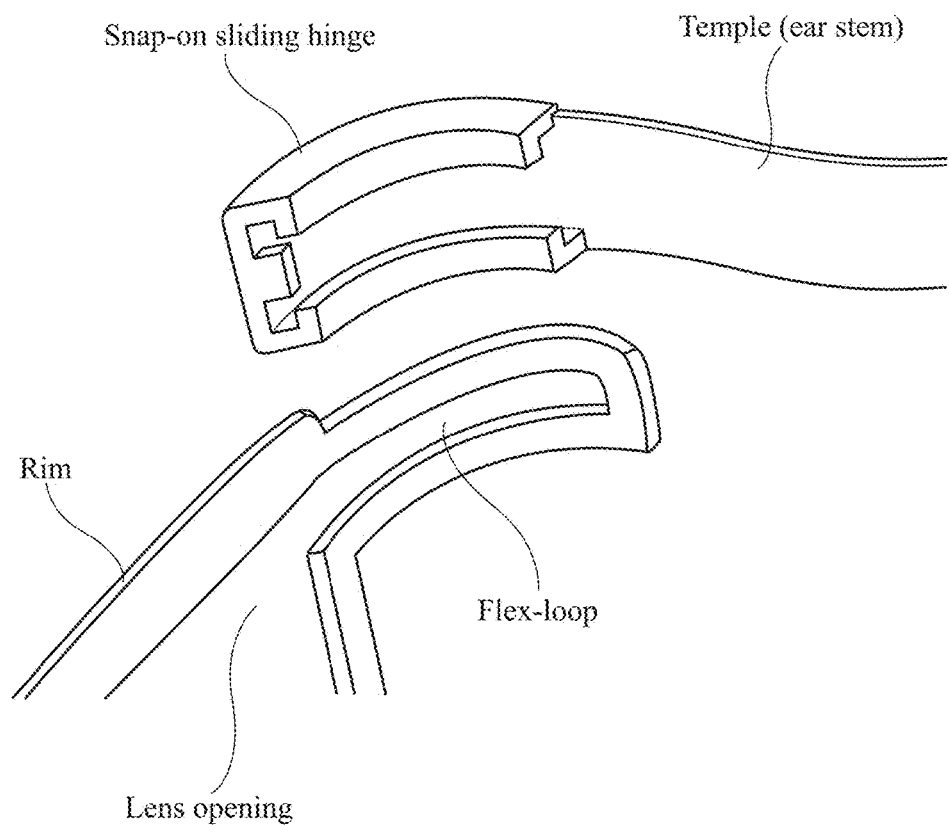
FIG. 2 is schematic drawing of a portion of an eyewear structure, which can minimize the use of fasteners and comprises substantially bulk-solidifying amorphous alloy. A portion of the front piece and a portion of a temple are depicted schematically according to one embodiment.

FIG. 2 shows that a schematic of a portion of the front piece (one of the rims) and a portion of a temple. In one embodiment, the rim defining the lens opening is a closed loop. In another embodiment, the front piece comprises a flex-loop on each side of the rim loop, opposite to the bridge side, and linked to the rim loop through a narrow strait. The size of the flex-loop loop can be similar to or larger than the linking strait. In one embodiment, the areal size of the flex-loop is substantially smaller then the defined lens opening loop. In one embodiment, the area of the flex-loop is less than 10% of the area of the rim-loop defining the lens opening. The areal shape defined by the flex-loop can be rectangular, square, circular, oval or any other closed loop shape with a side-opening.

In another embodiment, the cross-sectional view of the rim can be circular, square, oval, elliptic or rectangular. Furthermore, the cross section of the rim can incorporate grooves and slot, such that the edges of the lenses can be fitted and pressed into aforesaid grooves and slot. The cross-section of the flex opening loop can be circular, square, oval, elliptic or rectangular. In a more preferred embodiment of the invention, the cross-section of the flex opening loop is square or rectangular.

In one embodiment of the invention, the lens is secured into rim loop by the method including: enlarging the area of the rim loop by stretching the rim and the flex-loop; slipping the lens into rim opening and seat against the rim; and releasing the stretching of the rim and flex-loop. In one embodiment the area of the lens is slightly larger than the area defined by the rim opening such that upon installation if the lens, the rim structure presses against the lens and vice versa.

In still another embodiment, the temple (ear stem) has a structure on one end to provide linkage to the front piece or rim. In one preferred embodiment, the structure on the temple is such that it can interlock with the above-mentioned flex-loop. In still another embodiment of the invention, the flex-loop curves out of the plane of the front piece and towards the eye side. Similarly, in another embodiment, the end of the temple comprising the interlocking structure curves out of the plane of the temple and towards the eye side. In another embodiment, the flex-loop fits into the interlocking structure on the temple and can slide in the interlocking structure acting as a hinge mechanism. In one embodiment, the very end of the temple has a ridge, which can act as a stopping point for the sliding motion of the flex-loop.

Method of Making

One embodiment provides a method of producing eyewear structures in near-net shape form from bulk solidifying amorphous alloys. One contrast between the structure produced herein and the conventional fabrication technique is the high elasticity of the amorphous alloys described herein. The preferred materials commonly used in the fabrication of eyewear in general are shape-memory Ti—Ni alloys and spring steels, but these materials can only be produced in very limited shape and forms, such as wires and flat strips, due in part to their respective processing limitations.

In contrast, the near-net shape forming ability of bulk solidifying amorphous alloys allow the fabrication of intricate eyewear structures with high precision and reduced processing steps. This may allow the minimal use of bending and welding, which can reduce the structural performance and increase manufacturing costs and aesthetic defects. By producing eyewear structures in near-net shape form, manufacturing costs can be significantly reduced while still forming eyewear structures with intricate features comprising precision curves, and high surface finish on aesthetically sensitive areas.

One exemplary method of making such eyewear structures comprises the following steps: (1) providing a feedstock of amorphous alloy being substantially amorphous, and having an elastic strain limit of about 1.5% or greater and having a $\Delta T$ of 30° C. or greater; (2) heating the feedstock to around the glass transition temperature; (3) shaping the heated feedstock into the desired near-net shape of eyewear structure; and (4) cooling the formed part to temperatures far below the glass transition temperature.

$\Delta T$ herein refers to the difference between the onset of crystallization temperature, Tx, and the onset of glass transition temperature, Tg, such as those determined from standard DSC (Differential Scanning calorimetry) measurements at typical heating rates (e.g. 20° C./min). Preferably $\Delta T$ of the provided amorphous alloy is greater than 40° C., such as greater than 60° C., such as greater than 90° C., such as greater than 100° C.

The provided feedstock can have about the same thickness as the average thickness of the final eyewear structure. The feedstock may have an amorphous microstructure, a crystalline structure, or a composite structure (as described above).

The time and temperature of the heating and shaping operation may be selected such that the elastic strain limit of the amorphous alloy is substantially preserved to be not less than 1.0%, and preferably not being less than 1.5%. In some embodiments, temperatures "around glass transition" as described above refers to the forming temperatures can be below glass transition, at or around glass transition, and above glass transition temperature, but at temperatures below the crystallization temperature $T_x$. The cooling step may be carried out at rates similar to the heating rates at the heating step, and preferably at rates greater than the heating rates at the heating step. The cooling step is also achieved preferably while the forming and shaping loads are still maintained.

Upon completion of the above-mentioned fabrication method, the near-net shape eyewear structure can be subjected further surface treatment operations as desired, such as to remove any oxides on the surface. For example, chemical etching (with or without masks) can be utilized as well as light buffing and polishing operations to provide improvements in surface finish.

Another embodiment provides an alternative method of making an eyewear structure, the method comprising: (1) providing a homogeneous alloy feedstock of amorphous alloy; (2) heating the feedstock to a casting temperature above the melting temperatures; (3) introducing the molten alloy into the die cavity having the near-net shape of eyewear structure; (4) cooling (e.g., quenching) the molten alloy to temperatures below glass transition. The feedstock provided in this embodiment need not be amorphous, as the feedstock would undergo a (preferably rapid) cooling step (e.g., quenching) to produce an amorphous structure.

Bulk amorphous alloys retain their fluidity from above the melting temperature down to the glass transition temperature due to the lack of a first order phase transition. This is in direct contrast to conventional metals and alloys. Since, bulk amorphous alloys retain their fluidity, they do not accumulate significant stress from their casting temperatures down to below the glass transition temperature and as such dimensional distortions from thermal stress gradients can be minimized. Accordingly, eyewear structures with large intricate shapes can be produced cost-effectively.

Although specific embodiments are disclosed herein, it is expected that persons skilled in the art can and will design alternative eyewear structures comprising bulk solidifying amorphous and methods to produce eyewear structures comprising bulk solidifying amorphous that are within the scope of the present invention either literally or under the Doctrine of Equivalents.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. An eyewear structure comprising a rim and an ear stem, wherein the rim comprises a bulk-solidifying amorphous alloy that has an elastic limit of at least 1.5%, wherein the eyewear structure does not contain fasteners and the rim comprises a flexible loop that is inserted into a sliding hinge attached to the ear stem.

2. The eyewear structure of claim 1, comprising lenses which are secured without fasteners.

3. The eyewear structure of claim 1, wherein the bulk-solidifying amorphous alloy has an elastic limit of at least 1.8%.

4. The eyewear structure of claim 1, wherein the bulk-solidifying amorphous alloy has a ΔT of at least 60° C.

5. The eyewear structure of claim 1, wherein the bulk-solidifying amorphous alloy has a critical cooling rate of 500 K/sec or less.

6. The eyewear structure of claim 1, wherein the bulk-solidifying amorphous alloy is a Zr-based alloy.

7. The eyewear structure of claim 1, wherein the bulk-solidifying amorphous alloy is a ferrous based alloy.

8. The eyewear structure of claim 1, wherein the bulk-solidifying amorphous alloy is substantially free of Be.

9. The eyewear of claim 1, wherein the eyewear structure is resistant to chemical corrosion.

10. The eyewear structure of claim 1, wherein the ear stem is secured to the rim without fasteners.

11. The eyewear structure of claim 1, further comprising a hinge, wherein the ear stem is secured to the rim via the hinge without fasteners.

12. The eyewear structure of claim 11, wherein the rim comprises a flex loop, wherein the hinge comprises a snap-on sliding hinge, and wherein the flex loop snap fits into the snap-on sliding hinge.

13. An eyewear structure comprising a rim and an ear stem, wherein the rim comprises a bulk-solidifying amorphous alloy having an elastic limit of at least 1.5%, selected from $(Zr,Ti)a(Ni,Cu,Fe)b(Be,Al,Si,B)c$ wherein a=30-75; b=5-60 & c=0-50 atomic percentages; $(Zr,Ti)a(Ni,Cu)b(Be)c$ wherein a=40-75; b=5-50; & c=5-50 in atomic percentages; $(Zr,Ti)a(Ni,Cu)b(Be)c$ wherein a=40-65; b=7.5-35; & c=10-37.5 in atomic percentages; $(zr)a(Nb,Ti)b(Ni,Cu)c(Al)d$ wherein a=45-65; b=0-10; c=20-40; & d=7.5-15, wherein the structure is with no or minimal use of fasteners.

14. An eyewear structure comprising a rim and an ear stem, wherein the rim comprises a bulk-solidifying amorphous alloy having an elastic limit of at least 1.5%, selected from $Fe_{72}A_{15}Ga_2P_{11}C_6B_4$ and $Fe_{72}A_{17}Zr_{10}Mo_5W_2B_{15}$, wherein the structure is with no or minimal use of fasteners.

* * * * *